United States Patent [19]

Gardenhour, Jr. et al.

[11] Patent Number: 5,612,999
[45] Date of Patent: Mar. 18, 1997

[54] COILED CORD HOLDING ASSEMBLY

[76] Inventors: Charles E. Gardenhour, Jr., 3126 Belleview Ave., Cheverly, Md. 20785; Christopher E. Gardenhour, 6125 43rd St., Riverdale, Md. 20737

[21] Appl. No.: 845,605

[22] Filed: Mar. 4, 1992

[51] Int. Cl.[6] .................................................. H04M 1/00
[52] U.S. Cl. ............................................ 379/438; 379/437
[58] Field of Search .................................. 379/438, 435, 379/436, 437, 441, 440, 451, 426, 447, 449; 174/69

[56] References Cited

U.S. PATENT DOCUMENTS

| | | | |
|---|---|---|---|
| 856,260 | 6/1907 | Kaisling | 379/426 |
| 2,136,624 | 11/1938 | Kuhn | 379/438 |
| 2,678,779 | 3/1954 | Bellmer | 379/438 |
| 3,082,289 | 3/1963 | Allen | 174/69 |
| 3,157,451 | 11/1964 | Martini | 174/69 |
| 3,163,707 | 12/1964 | Darling | 174/69 |
| 3,373,954 | 3/1968 | Hilsinger, Jr. | 379/438 |
| 3,377,442 | 4/1968 | Foster, Jr. | 379/438 |
| 5,018,185 | 5/1991 | Riddle | 379/438 |

*Primary Examiner*—Thomas W. Brown
*Assistant Examiner*—Jack Chiang
*Attorney, Agent, or Firm*—Aquilino & Welsh

[57] ABSTRACT

A coiled cord holding assembly and a method for installing the assembly so as to conceal a coiled handset telephone cord within an enclosure. The assembly includes a face plate with an aperture therein, a tubular elbow mounted to the face plate, a length of tubing extending from the elbow and a cord securing device for preventing a portion of the coiled handset telephone cord from traveling out of the length of tubing when the handset telephone cord is being extracted from and retracted into the coiled cord holding assembly.

21 Claims, 3 Drawing Sheets

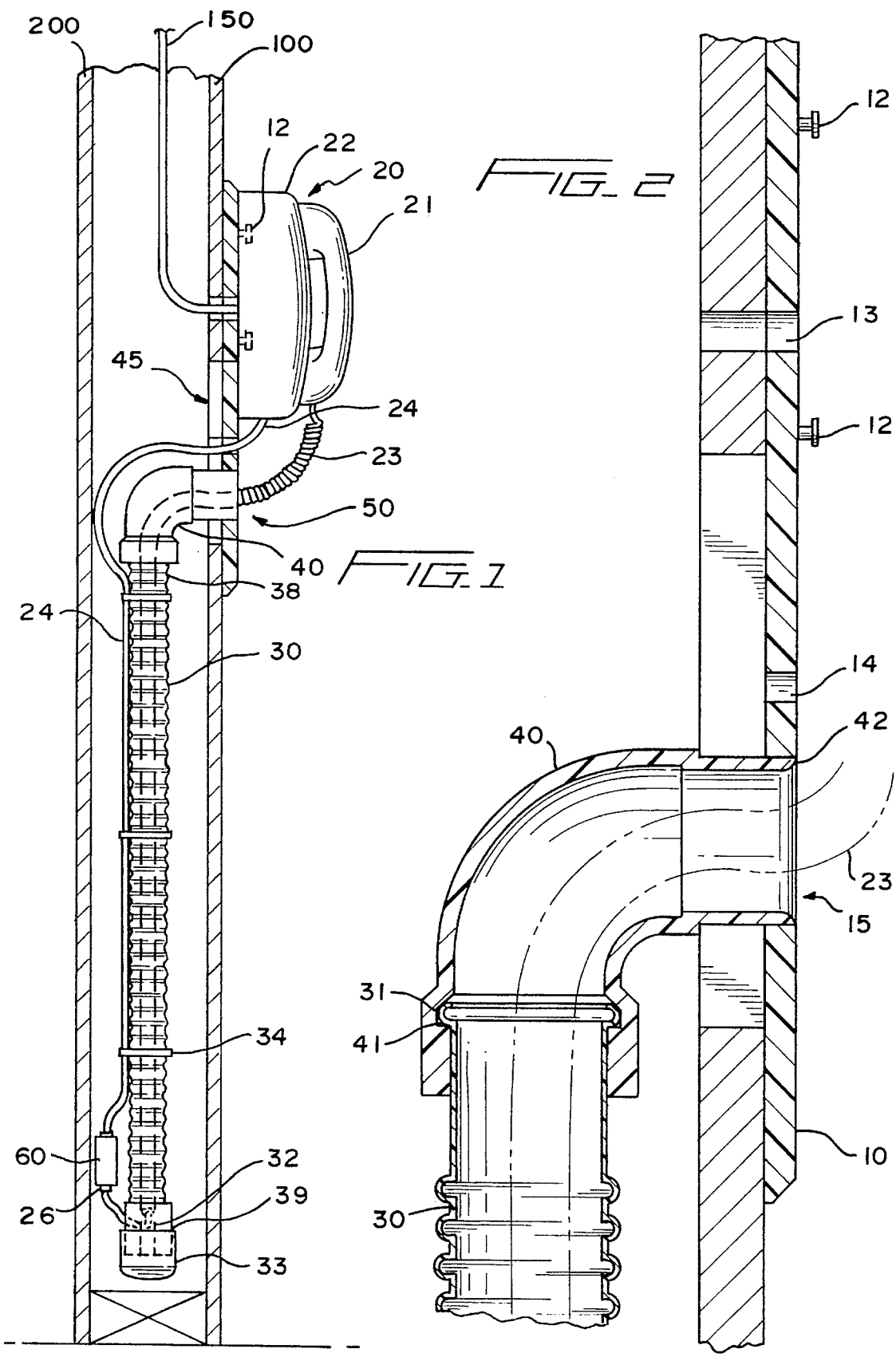

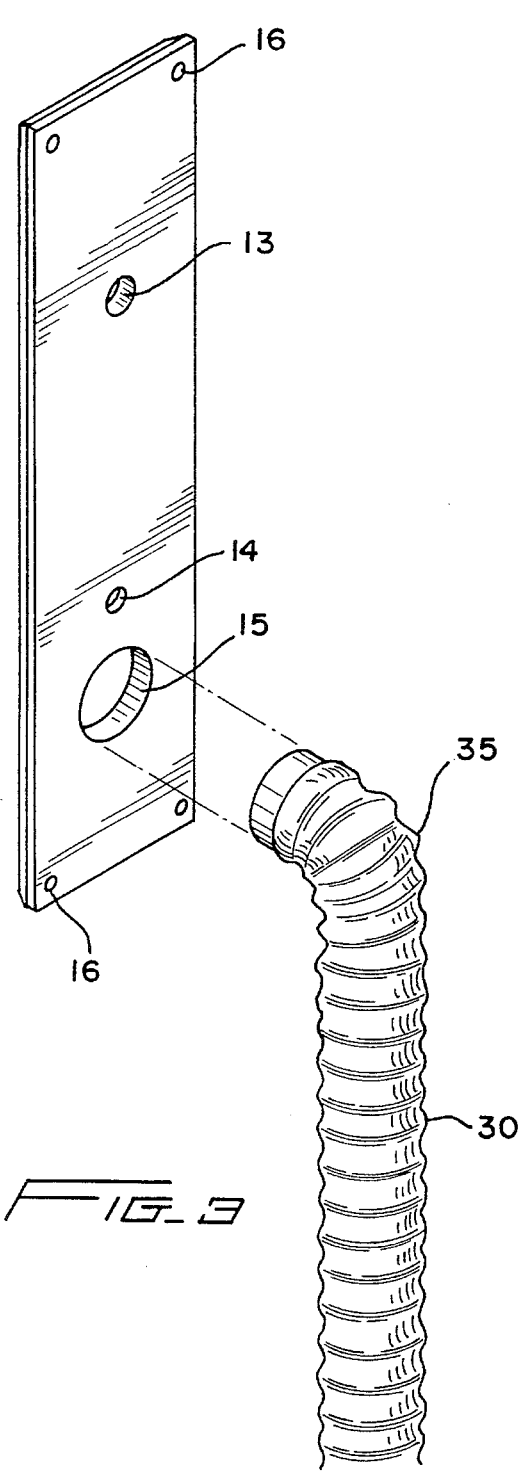
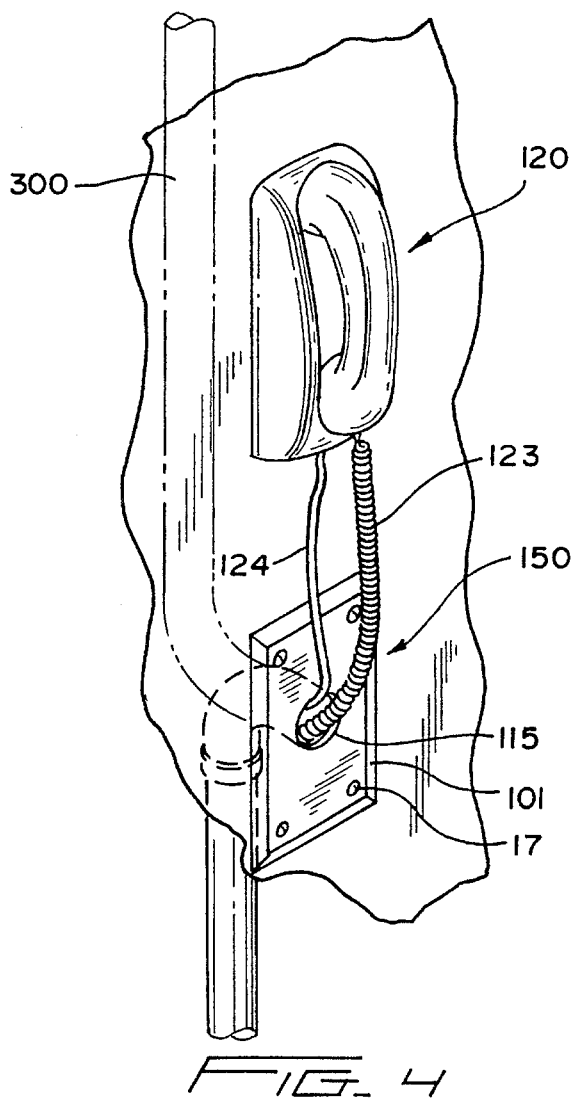
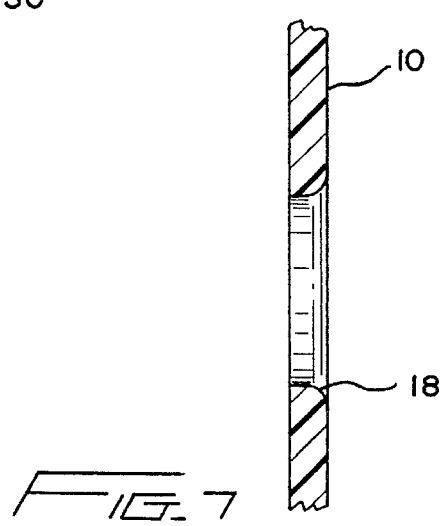

5,612,999

COILED CORD HOLDING ASSEMBLY

BACKGROUND OF THE INVENTION

1. Field of the Invention

The present invention generally relates to an assembly for holding and protecting a coiled cord within an enclosure, such as a wall, and more specifically, is in the field of telephone accessories.

2. Description of the Prior Art

The only prior art known about which relates to the present invention is that disclosed by Hilsinger, Jr. (U.S. Pat. No. 3,373,954). However, this reference is only relevant to the extent that it shows a tubular member for storing a coiled handset cord. Hilsinger, Jr. fails to recognize the need for concealing the handset cord within an enclosure and the structure necessary to do so.

The problem of giving a wall mounted telephone a cleaner appearance and the desire to protect telephone handset cords from damage while hanging spurred the development of the present invention. Since the handset cord of a wall mounted telephone hangs down along the wall into the room, it will become dirty, tangled, stretched out and damaged over time. Further, allowing the cord to hang down in the room can be dangerous to children, as it attracts their attention. Thus, a child could be come entangled with the cord and choke himself or pull the handset off the base such that the handset strikes him in the head. For the above reasons, and in view of the fact that the prior art does not appear to have provided any solutions to the problem at hand, the development of the present invention occurred.

SUMMARY OF THE INVENTION

The present invention is a coiled cord holding assembly for mounting coiled cords within an enclosure. The coiled cord holding assembly functions to conceal and protect a coiled handset telephone cord. The assembly includes a face plate with an aperture, a tubular elbow secured thereto, a length of tubing connected to the elbow, and a securing means for preventing the coiled handset cord from escaping the tubing. One end of the coiled handset telephone cord is connected to the distal end of the tubing and the other end is connected to the handset of the telephone. Therefore, the handset cord is retained within the tubing and thus the handset cord is protected as well as being prevented from tangling together.

It is an object of the present invention to provide an assembly for mounting and holding coiled cords within an enclosure, more particularly, a wall.

It is another object of the invention to provide an assembly which prevents a coiled handset telephone cord from becoming tangled and damaged, thus extending the life of the cord.

It is a further object of the invention to provide an assembly for maintaining telephone cords out of the reach of small children, thereby preventing them from pulling the cord or becoming entangled with the cord.

A further object of the invention is to provide a wall mounted assembly for holding a telephone cord which can easily be removed and reinstalled within the wall, should the telephone cord become inoperative.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a side view of the preferred embodiment of the invention shown mounted within a wall.

FIG. 2 is a cross-sectional detailed view of the face plate and the elbow used in the present invention.

FIG. 3 is an unassembled rear perspective view of another embodiment.

FIG. 4 is a front perspective view of still another embodiment showing various directions in which the tubing behind the surface of the enclosure can project.

FIG. 7 is a partial sectional view of a face plate used with the present invention.

DESCRIPTION OF THE PREFERRED EMBODIMENTS

Figures 5, 6:
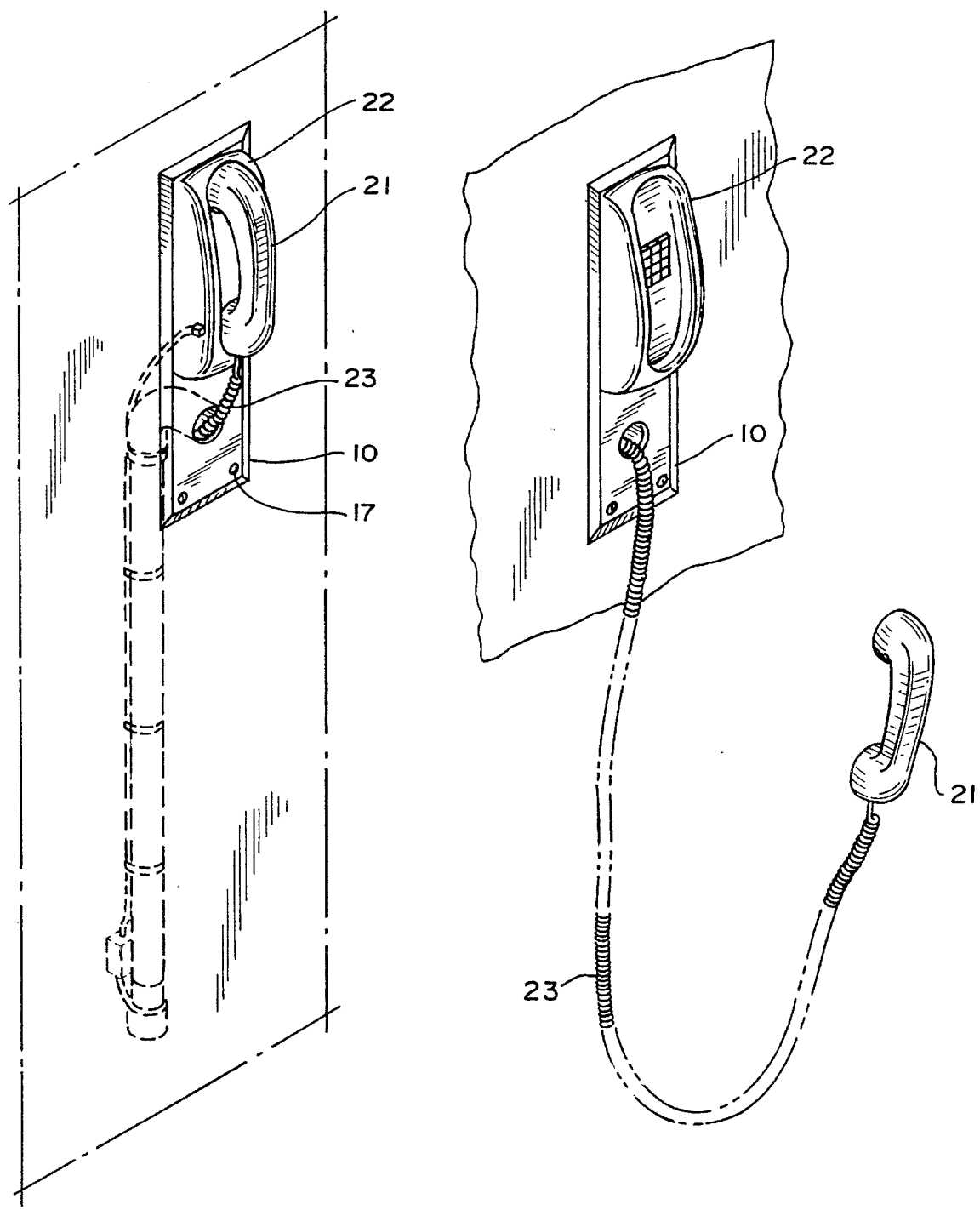
FIG. 5 is a front perspective view showing the handset cord in its fully retracted position.
FIG. 6 is a front perspective view showing the handset cord in its extended operational position.

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIG. 1, a conventional wall-mounted telephone 20 is shown having a base 22 and a handset 21. The base 22 of the telephone includes openings (not shown) to receive studs 12, best shown in FIG. 2 for mounting the telephone on the wall. The telephone 20 is connected to the incoming telephone line 150 through an aperture 13 in the face plate 10. Without the addition of telephone cord holding assembly 50, the coiled handset cord 23 would be coupled to both the handset 21 and the base 22. When the handset cord 23 is coupled in this manner, it would be free to hang into the room in the reach of a child, and in this hanging state, the handset cord 23 over time becomes entangled with itself.

The telephone cord holding assembly 50 of the present invention includes a face plate 10, an elbow 40 connected to the face plate 10, a length of tubing 30 having a first proximal end 38 secured to the elbow 40 and a second distal end 39 including a means for securing the telephone cord thereto. Face plate 10 not only functions to secure assembly 50 to wall 100 but also functions to cover hole 45 made in wall 100 in order to install the telephone cord holding assembly 50 within walls 100 and 200. Suspended and supported from face plate 10 is the remainder of the assembly 50, which includes the elbow 40 and tubing 30. Thus, it is apparent that once installed, the only part of the assembly exposed is the face plate 10.

The face plate 10, as shown in FIG. 3, includes a telephone line mounting aperture 13 located between mounting studs 12, a base cord aperture 14, a larger handset cord aperture 15 a first support engaging surface 11a and a second oppositely disposed telephone mounting surface 11b. The face plate 10 also includes an aperture 16 approximate each corner which is adapted to receive a fastener 17 for securing the face plate 10 to the wall 100. In the preferred embodiment, the face plate 10 is manufactured from plastic, however, any suitable materials, such as wood or metal, could be used.

A tubular elbow 40 is connected to the face plate 10 so as to cooperate with the handset cord aperture 15. The hollow elbow 40 may be glued within the handset cord aperture 15 or secured to the rear of the face plate 10 in any known manner. As most clearly shown in FIG. 2, the edges of the opening through which handset cord 23 is to extend are rounded or beveled. As shown, the end 42 of elbow 40 is rounded, thus when secured within the handset cord aperture 15, the edges of the opening become rounded. However, in an alternative embodiment as shown in FIG. 7, the edges of handset cord aperture 15 are rounded or beveled at 18. The rounded ends provide for a smooth extension and retraction of the coiled handset cord 23, regardless from which direction the cord 23 is being extended. The opposite end of the elbow 40 not secured to the face plate 10 is shown directed downward, however, depending upon where assembly 50 is installed, the elbow 40 may face upward or sideways. The end not secured to the face plate 10 includes a connection means 41 for removably connecting the length of tubing 30 thereto. As shown in greater detail in FIG. 2, one form of removable connection means 41 is an annular recess approximate the end of the elbow 40. The annular recess 41 cooperates with a circumferential projection 31 on the proximate end of the length of tubing 30 in order to secure the elbow 40 to the tubing 30. As shown, tubular elbow 40 is made from plastic, but any suitable material could be used. Further, tubular elbow 40 is depicted as circular, however, various other geometric shapes are envisioned, such as rectangular.

The length of the tubing 30 can vary depending upon what size handset cord 23 is to be used. The length of tubing 30 can be manufactured from various different materials of various different shapes and various degrees of rigidity, but plastic corrugated tubing with a diameter of 1.5 inches has been found to be the most suitable. Due to the corrugated tubing's flexing and bending abilities, the size of hole 45 required to be made in the wall in order to install the assembly 50 can be minimized, as the tubing 30 can bend through hole 45. The hole 45 need only be of a size sufficient to permit the passage of elbow 40 therethrough. Thus, the hole 45 is small enough that it can be covered with a smaller face plate 101 which does not include a telephone mounting portion, as shown in FIG. 4. The size of the hole 45 made in the wall is not as critical when face plate 10 including a telephone mounting portion is used. The telephone mounting portion extends the length of face plate 10, thus making the face plate considerably larger.

Again with reference to FIG. 1, base cord 24 can either run through the handset cord aperture 15 or through an optional base cord aperture 14. In the preferred embodiment, the base cord 24 includes a first end connected to the base 22 of the telephone 20 and a second end which runs through the base cord aperture 14, then down along with length of the tubing 30 to a junction point 60 approximate the end of the tubing 30. The base cord 24 may be secured to the outside of the tubing 30 by straps 34. The coiled handset cord 23 is connected to the telephone handset 21 at a first end and has a second end with a coupler 26 which runs through the handset cord aperture 15, elbow 40 and length of tubing 30, where it is coupled to the second end of the base cord 24 at the junction point 60. Therefore, base cord 24 and handset cord 23 function together in order to connect the telephone base 22 to the telephone handset 21.

The second end of the coiled handset cord 23 is prevented from traveling back up through the length of tubing 30 by means of a suitable telephone cord securing means, such as a slot 32 in the distal end of the tubing 30. The slot 32 is smaller in cross-section than that of coupler 26 at the second end of the handset cord 23. Therefore, once the cord is slid into slot 32 with coupler 26 located on the outside of tubing 30, coupler 26 cannot reenter the tubing 30. Further, the end of handset cord 23 is prevented from slipping through the slot 32 by means of a cap 33, which when placed on the end of the tubing 30, reduces the effective length of the slot 32. If, as shown, the second ends of the base cord 24 and handset cord 23 are coupled together by a junction box 60, the second end of the handset cord 23 is prevented from traveling back up through the length of tubing 30, as cross-section of junction box 60 is considerably larger than slot 32.

To install the assembly 50, a hole 45, preferably rectangular, having minimum dimensions determined by the size of elbow 40, is cut into the wall 100. A completely assembled unit 50, including base and handset cords, is then angled through the hole 45. Once the elbow 40 and tubing 30 are completely within the walls 100 and 200, the face plate 10 is secured to the wall 100 by suitable removable and reusable fasteners 17 which may be in the form of toggle bolts. The base cord 24 and handset cord 23 are then hooked up to the telephone 20 at their respective outlets. If it becomes necessary to make any repairs to the device, all one needs to do is to unhook the cords from the telephone, remove the face plate 10 from wall 100 by unsecuring the fasteners 17 and then pull the assembly back through hole 45 until the distal end 39 of the length of tubing 30 clears the edges of hole 45. The invention may be installed aftermarket in place of an existing telephone mount, in addition to an existing telephone mount, or it can be installed as original equipment during construction of a home.

In operation, the assembly 50 would be as shown in FIGS. 5 and 6. In FIG. 5, the telephone 20 is shown with handset cord 23 fully retracted within the wall. When the telephone 20 rings, one simply answers it as they now do, and the handset cord 23 can be extended as shown in FIG. 6. Once the call has ended, the handset cord 23, due to gravity and its own self coiling effect, will travel back into the tubing 30 with little assistance being required. Since the handset cord 23 is enclosed within tubing 30, it is protected from damage not only when being extracted or retracted, but at all times because the assembly prevents the handset cord 23 from becoming tangled when the telephone 20 is not in use. This is because the handset cord 23 no longer hangs from both of its ends. The handset cord 23 now only hangs from one end while its other end is maintained spaced therefrom by the tubing 30. In this retracted state, the handset cord 23 tends to maintain its self-coiling effect for a longer period of time than if the cord 23 was allowed to hang, as the coils have a chance to recover when the telephone is not in use. Once installed, the telephone cord holding assembly 50 provides a clean, aesthetically pleasing appearance with very little of the unsightly handset cord 23 being in view. Parents no longer have to worry about infants injuring themselves with the cord or pulling the cord with such a force that the handset 21 itself is dislodged and drops to the ground, striking the infant or the floor.

An alternate embodiment 150 is shown in FIG. 4. The assembly 150 differs from the other embodiments in that it is not necessarily for a coiled telephone handset cord, as it can function with almost any coiled cord. In this embodiment, the face plate 101 can be mounted to either a vertical or horizontal surface 300 upon which it is desired to conceal a length of coiled cord. The invention would function in the same manner if the elbow was removed and the length of tubing was connected directly to the face plate 101 in order to cooperate with aperture 115. Although not shown, a length of straight or coiled tubing could be connected to face plate 101. As shown, telephone 120 would be secured to or rested on concealing surface 300 and the cord 124 would either run through the coiled cord aperture 115, through a smaller cord aperture in the face plate (not shown), or through a hole in concealing surface 300 behind the telephone 120.

Another alternative embodiment is set forth in FIG. 3. In this modified version, the length of tubing 30 itself could have an elbow or a bent portion 35 which is secured to the face plate 10.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A coiled telephone cord holding assembly comprising:

a face plate having a first support engaging surface and a second oppositely disposed surface with a coiled cord aperture therein running through said face plate;

a length of tubing having a proximal end connected to said face plate in order to cooperate with said aperture and extending from said first face plate surface away from said second surface;

a coiled cord securing means located on said length of tubing for preventing a portion of a coiled cord from being extracted from said length of tubing;

further comprising a tubular elbow positioned between said face plate and said length of tubing said tubular elbow having a first end which cooperates with said aperture and a second end connected to said proximal end of said length of tubing.

2. A coiled telephone cord holding assembly comprising:

a face plate having a first support engaging surface and a second oppositely disposed surface with a coiled cord aperture therein running through said face plate;

a length of tubing having a proximal end connected to said face plate in order to cooperate with said aperture and extending from said first face plate surface away from said second surface, wherein said length of tubing is flexible; and a coiled cord securing means located on said length of tubing for preventing a portion of a coiled cord from being extracted from said length of tubing.

3. The invention of claim 1 wherein the first end of said elbow fits within the aperture and is affixed thereto.

4. The invention of claim 1 wherein the second end of said elbow includes an annular ring for removably connecting the length of tubing thereto.

5. The invention of claim 4 wherein one end of said length of tubing includes a circumferential projection which is insertable into said annular ring.

6. A coiled telephone cord holding assembly comprising:

a face plate having a first support engaging surface and a second oppositely disposed surface with a coiled cord aperture therein running through said face plate;

a length of tubing having a proximal end connected to said face plate in order to cooperate with said aperture and extending from said first face plate surface away from said second surface;

a coiled cord securing means located on said length of tubing for preventing a portion of a coiled cord from being extracted from said length of tubing;

wherein the coiled cord securing means includes a slot approximate the distal end of said length of tubing and a cap which attaches to the distal end of the length of tubing so as to cooperate with the slot in order to vary the length of the slot.

7. The invention of claim 1 wherein either the first end of said elbow is rounded or the edges of the coiled cord aperture are rounded.

8. A coiled telephone cord holding assembly comprising:

a face plate having a first support engaging surface and a second oppositely disposed surface with a coiled cord aperture therein running through said face plate;

a length of tubing having a proximal end connected to said face plate in order to cooperate with said aperture and extending from said first face plate surface away from said second surface, wherein said length of tubing is corrugated; and a coiled cord securing means located on said length of tubing for preventing a portion of a coiled cord from being extracted from said length of tubing.

9. A coiled telephone cord holding assembly comprising:

a face plate having a first support engaging surface and a second oppositely disposed surface with a coiled cord aperture therein running through said face plate, wherein said face plate includes at least one other aperture therein;

a length of tubing having a proximal end connected to said face plate in order to cooperate with said aperture and extending from said first face plate surface away from said second surface;

a coiled cord securing means located on said length of tubing for preventing a portion of a coiled cord from being extracted from said length of tubing.

10. A telephone mounting plate in combination with a telephone cord holding assembly comprising:

a face plate having a first surface and a second oppositely disposed surface with telephone mounting studs spaced apart from one another extending therefrom and a handset cord aperture running through the face plate;

a tubular elbow having a first end connected to said face plate in order to cooperate with said aperture and extending from said first face plate surface away from said second surface;

a length of tubing having a proximal end connected to a second end of said elbow; and a telephone cord securing means located on said length of tubing for preventing a portion of a handset cord from being extracted from said length of tubing.

11. The invention of claim 10 further including a first length of telephone cord on the outside of the tubing having a first and second end wherein the first end is adapted to be connected to a telephone base; and a coiled handset telephone cord having a first end adapted to be connected to the handset of the telephone and a second end running through the aperture, elbow and tubing to connect with the second end of said first length of telephone cord.

12. The invention of claim 10 wherein said length of tubing is flexible.

13. The invention of claim 10 wherein the first end of said elbow fits within the aperture and is affixed thereto.

14. The invention of claim 10 wherein the second end of said elbow includes an annular ring for removably connecting the length of tubing thereto.

15. The invention of claim 14 wherein one end of said length of tubing includes a circumferential projection which is insertable into said annular ring.

16. The invention of claim 10 wherein the telephone cord securing means includes a slot approximate the distal end of said length of tubing and a cap which attaches to the distal end of the length of tubing so as to cooperate with the slot in order to vary the length of the slot.

17. The invention of claim 10 wherein either the first end of said elbow is rounded or the edges of the handset cord aperture are rounded.

18. The invention of claim 10 wherein said length of tubing is corrugated.

19. The invention of claim 11 wherein the face plate further includes at least one other aperture therein.

20. A telephone mounting plate in combination with a telephone cord holding assembly comprising:

a face plate having a first surface and a second oppositely disposed surface with telephone mounting studs located spaced from one another thereon and a handset cord aperture running through the face plate;

a length of tubing having a proximal end connected to said face plate in order to cooperate with said aperture and extending from said first face plate surface away from said second surface;

a telephone cord securing means located on said length of tubing for preventing a portion of a handset cord from being extracted from said length of tubing;

a first length of telephone cord on the outside of the tubing having a first and second end wherein the first end is adapted to be connected to a telephone base; and a coiled handset telephone cord having a first end adapted to be connected to the handset of the telephone and a second end running through the length of tubing to connect with the second end of said first length of telephone cord.

21. A method of installing a coiled telephone cord holding assembly comprising:

a face plate having a first support engaging surface and a second oppositely disposed surface with a coiled cord aperture therein running through said face plate;

a length of tubing having a proximal end connected to said face plate in order to cooperate with said aperture and extending from said first face plate surface away from said second surface;

a coiled cord securing means located on said length of tubing for preventing a portion of a coiled cord from being extracted from said length of tubing;

wherein the method comprises:
  a. removing a telephone from its mounting plate;
  b. removing the mounting plate;
  c. cutting a hole large enough to accommodate the dimensions of said length of tubing where it connects to said face plate;
  d. angling the said length of tubing through said hole until said face plate covers said hole;
  e. securing said face plate to a wall with a plurality of fasteners; and then
  f. reinstalling the telephone such that the handset is connected to the coiled handset cord and the base is connected to said base cord.

* * * * *